US010682907B2

(12) United States Patent
Muramatsu et al.

(10) Patent No.: US 10,682,907 B2
(45) Date of Patent: Jun. 16, 2020

(54) VEHICLE BODY STRUCTURE

(71) Applicant: HONDA MOTOR CO., LTD., Minato-ku, Tokyo (JP)

(72) Inventors: Yuki Muramatsu, Wako (JP); Masahito Murota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 16/000,915

(22) Filed: Jun. 6, 2018

(65) Prior Publication Data
US 2019/0001814 A1    Jan. 3, 2019

(30) Foreign Application Priority Data

Jun. 30, 2017   (JP) .................................. 2017-129320

(51) Int. Cl.
| | |
|---|---|
| *B60K 15/067* | (2006.01) |
| *B60K 15/073* | (2006.01) |
| *B60K 15/035* | (2006.01) |
| *B60K 15/063* | (2006.01) |
| *B60K 15/03* | (2006.01) |

(52) U.S. Cl.
CPC .......... *B60K 15/067* (2013.01); *B60K 15/035* (2013.01); *B60K 15/03519* (2013.01); *B60K 15/063* (2013.01); *B60K 15/073* (2013.01); *B60K 2015/03289* (2013.01); *B60K 2015/0633* (2013.01)

(58) Field of Classification Search
CPC ............................... B60K 15/067; B60K 15/07
See application file for complete search history.

(56) References Cited

U.S. PATENT DOCUMENTS

| | | | | |
|---|---|---|---|---|
| 7,841,624 | B2* | 11/2010 | Kobayashi | ....... B60K 15/03504 180/69.4 |
| 9,579,972 | B2* | 2/2017 | Taniguchi | ............ B60K 15/067 |
| 10,093,176 | B2* | 10/2018 | Muramatsu | ............ B60K 15/07 |

(Continued)

FOREIGN PATENT DOCUMENTS

| | | |
|---|---|---|
| JP | 58-119466 | 8/1983 |
| JP | 2002-192966 | 7/2002 |
| JP | 2008-013078 | 1/2008 |

(Continued)

OTHER PUBLICATIONS

Japanese Notice of Allowance for Japanese Patent Application No. 2017-129320 dated Dec. 4, 2018.

*Primary Examiner* — Kevin Hurley
(74) *Attorney, Agent, or Firm* — Amin, Turocy & Watson, LLP

(57) ABSTRACT

A vehicle body structure includes a rear floor panel, a first rear cross member, a fuel tank and a VSF valve. The rear floor panel includes a first wall and a second wall. The first rear cross member includes a pair of first vertical walls extending in an upward/downward direction, and a first horizontal wall configured to connect lower ends of the pair of first vertical walls. The fuel tank includes a second connecting surface extending along the first horizontal wall. The first horizontal wall includes a pair of horizontal sections and an inclined section. The VSF valve is installed at a position overlapping the inclined section in a forward/rearward direction of a vehicle body.

5 Claims, 8 Drawing Sheets

(56) References Cited

U.S. PATENT DOCUMENTS 10,118,482 B2 * 11/2018 Muramatsu .......... B60K 15/067
2011/0284299 A1 * 11/2011 Takahashi ................ B60K 1/04
                                                          180/65.21

FOREIGN PATENT DOCUMENTS

| JP | 5494429 | 5/2014 |
| JP | 2016-088126 | 5/2016 |

* cited by examiner

VEHICLE BODY STRUCTURE

CROSS-REFERENCE TO RELATED APPLICATION

Priority is claimed on Japanese Patent Application No. 2017-129320, filed Jun. 30, 2017, the content of which is incorporated herein by reference.

BACKGROUND OF THE INVENTION

Field of the Invention

The present invention relates to a vehicle body structure.

Description of Related Art

A vehicle body structure in which a kick-up unit is raised upward toward the rear of a vehicle body from a rear seat, a rear cross member is installed under the kick-up unit, and a fuel tank is disposed to avoid the rear cross member is known.

In the fuel tank, a concave section constituted by a horizontal section and a vertical wall section is formed on an area facing the rear cross member to avoid the rear cross member. The horizontal section is horizontally formed along a bottom section of the rear cross member. The vertical wall section is substantially vertically formed along a rear wall section of the rear cross member. The concave section is formed in an L-shaped cross section and is recessed downward due to the horizontal section and the vertical wall section (for example, see Japanese Patent No. 5494429 (hereinafter, Patent Document 1)).

Incidentally, a vent shaft float valve (hereinafter, referred to as a VSF valve) configured to open and close a flow path communicating with a canister is installed in a fuel tank. The VSF valve is opened when evaporated fuel is generated in the fuel tank and an internal pressure of the fuel tank is increased. When the VSF valve is opened, the evaporated fuel is guided into the canister. That is, the VSF valve is disposed above a fuel liquid surface such that the evaporated fuel may be extracted from an opening. For this reason, the VSF valve is attached to an upper section of the fuel tank.

SUMMARY OF THE INVENTION

In the vehicle body structure in Patent Document 1, the fuel tank is constituted by the horizontal section and the vertical wall section in the concave section having the L-shaped cross section recessed downward to avoid the rear cross member. That is, the concave section having the L-shaped cross section protrudes inward from the fuel tank. In the vehicle body structure, for example, when the vehicle is stopped in an inclined state, the VSF valve may be disposed under the inclined fuel tank.

In this case, it is conceivable that a liquid surface of fuel may come in contact with the concave section protruding inward from the fuel tank, and air may not enter the fuel tank on the side of the VSF valve. Accordingly, fuel may remain in the fuel tank on the side of the VSF valve, the VSF valve may be immersed in the fuel, and a gas introduction port of the VSF valve (i.e., an opening/closing valve) may be closed by the fuel. For this reason, it is difficult for evaporated fuel in the fuel tank to be guided into the canister.

As a countermeasure for this, moving a bottom section of the rear cross member to an upper side and restricting a protrusion amount of the concave section to the fuel tank to a small degree may be conceived. However, when the bottom section of the rear cross member is moved upward, a cross-sectional area of the rear cross member is reduced, and there is a room for improvement from this viewpoint.

In consideration of the above-mentioned circumstances, an aspect according to the present invention is to provide a vehicle body structure in which immersion of an opening/closing valve in fuel is inhibited when a fuel tank is inclined, and further, reduction of a cross-sectional area of a rear cross member can be inhibited.

In order to solve the problems, the present invention employs the following aspects.

(1) A vehicle body structure according to an aspect of the present invention includes a floor including a first wall extending in a forward/rearward direction of a vehicle body and a second wall disposed above the first wall and extending in the forward/rearward direction of the vehicle body; a cross member installed below the floor and extending in a vehicle width direction between the first wall and the second wall; a fuel tank disposed below the floor; and an opening/closing valve installed on an upper section of the fuel tank, wherein the cross member includes: a pair of vertical walls extending in an upward/downward direction; and a horizontal wall configured to connect lower ends of the pair of vertical walls, the fuel tank includes: a first surface extending along the first wall; a second surface extending along the second wall; and a connecting surface configured to connect the first surface and the second surface and extending along the horizontal wall, the horizontal wall includes: horizontal sections extending in a substantially horizontal direction; and an inclined section inclined upward from the first wall toward the second wall, and the opening/closing valve is installed at a position overlapping the inclined section in the forward/rearward direction of the vehicle body.

According to the aspect of (1), the first surface and the second surface of the fuel tank are connected by the connecting surface, and the connecting surface extends along the horizontal wall of the cross member. The horizontal wall includes the horizontal sections and the inclined section. The opening/closing valve is installed at the position overlapping the inclined section in the forward/rearward direction of the vehicle body.

Accordingly, an area of the connecting surface overlapping the opening/closing valve in the forward/rearward direction of the vehicle body can be formed along the inclined section. That is, the connecting surface is formed so as to be inclined, and a protrusion amount of the connecting surface to the inner section of the fuel tank can be restricted to a small degree. Accordingly, for example, when the vehicle is stopped while being inclined, if the opening/closing valve is disposed below the inclined fuel tank, it is possible to prevent fuel from coming in contact with the connecting surface.

As contact of the fuel with the connecting surface is prevented, air can be guided to the lower side of the fuel tank (on the side of the opening/closing valve). As the air is guided to the lower side of the fuel tank, the fuel in the fuel tank on the lower side can be moved upward. Accordingly, it is possible to prevent the opening/closing valve from being immersed in the fuel and the gas introduction port of the opening/closing valve from being closed by the fuel. Accordingly, evaporated fuel in the fuel tank can be guided to a canister via the gas introduction port of the opening/closing valve.

In addition, the horizontal wall includes the horizontal section and the inclined section. Accordingly, the other portion of the horizontal wall of the cross member except the inclined section is able to be the horizontal section. Accordingly, reduction in cross-sectional area of the cross member can be inhibited, and rigidity for the cross member can be secured.

(2) In the aspect of (1), the inclined section may be formed at a center in the vehicle width direction, and the horizontal sections may be formed at both sides of the inclined section.

Here, it is conceivable that a load may be input to both of side portions of the cross member from, for example, a rear suspension. For this reason, it is preferable to secure rigidity for both side portions of the cross member.

According to the aspect of (2), the inclined section is formed at a center in the vehicle width direction and the horizontal sections are formed at both sides of the inclined section. The horizontal sections are formed to have a cross-sectional area larger than that of the inclined section. Accordingly, the rigidity of both side portions of the cross member can be increased. Accordingly, for example, rigidity for both side portions of the cross member with respect to the load input from the rear suspension can be secured.

(3) In the aspect of (1) or (2), a bulk head extending in a direction crossing a longitudinal direction of the cross member may be installed on a connecting section between the horizontal section and the inclined section.

Here, a cross-sectional area decreases from the connecting section between the horizontal section and the inclined section toward the inclined section. That is, a cross-sectional area of the connecting section between the horizontal section and the inclined section varies. For this reason, it is thought that stress is concentrated to the connecting section between the horizontal section and the inclined section, and the connecting section becomes an origin for fracturing of the cross member.

According to the aspect of (3), the bulk head is installed on the connecting section between the horizontal section and the inclined section. Accordingly, the connecting section can be reinforced by the bulk head. Accordingly, it is possible to prevent the connecting section from becoming an origin for fracturing of the cross member.

(4) In the aspect of (3), a seat may be disposed above the first wall, and an anchor for a child seat attached to the seat may be connected to the bulk head.

According to the aspect of (4), the anchor for a child seat is connected to the bulk head. Accordingly, it is possible to strongly attach the anchor using the bulk head. Accordingly, in order strongly attach the anchor, a reinforcement member that is required can be removed, and the number of parts can be reduced.

(5) In the aspect of any one of (1) to (4), a second cross member may be installed above the second wall, and the opening/closing valve may have at least a portion disposed below the second cross member.

Here, the second wall is disposed above the first wall. For this reason, it is preferable that the second wall be reinforced by the cross member.

According to the aspect of (5), the second cross member is installed over the second wall. Accordingly, a strength of the second wall can be reinforced by the cross member.

In addition, the opening/closing valve is disposed below the second cross member. Accordingly, the opening/closing valve can be disposed further upward to correspond to the second wall. Accordingly, the second surface of the fuel tank can be disposed above the vicinity of the second wall to be aligned with the opening/closing valve, and a large tank capacity for the fuel tank can be secured.

According to the aspects of the present invention, the first surface and the second surface of the fuel tank are connected by the connecting surface, and the connecting surface extends along the horizontal wall of the cross member. The horizontal wall includes the horizontal sections and the inclined section, and the opening/closing valve is installed at a position overlapping the inclined section in the forward/rearward direction of the vehicle body.

Accordingly, an area of the connecting surface overlapping the opening/closing valve in the forward/rearward direction of the vehicle body can be formed along the inclined section. Accordingly, it is possible to prevent the opening/closing valve from being immersed in the fuel when the fuel tank is inclined, and further, inhibit reduction in cross-sectional area of the rear cross member.

DETAILED DESCRIPTION OF THE INVENTION

Figure 1:
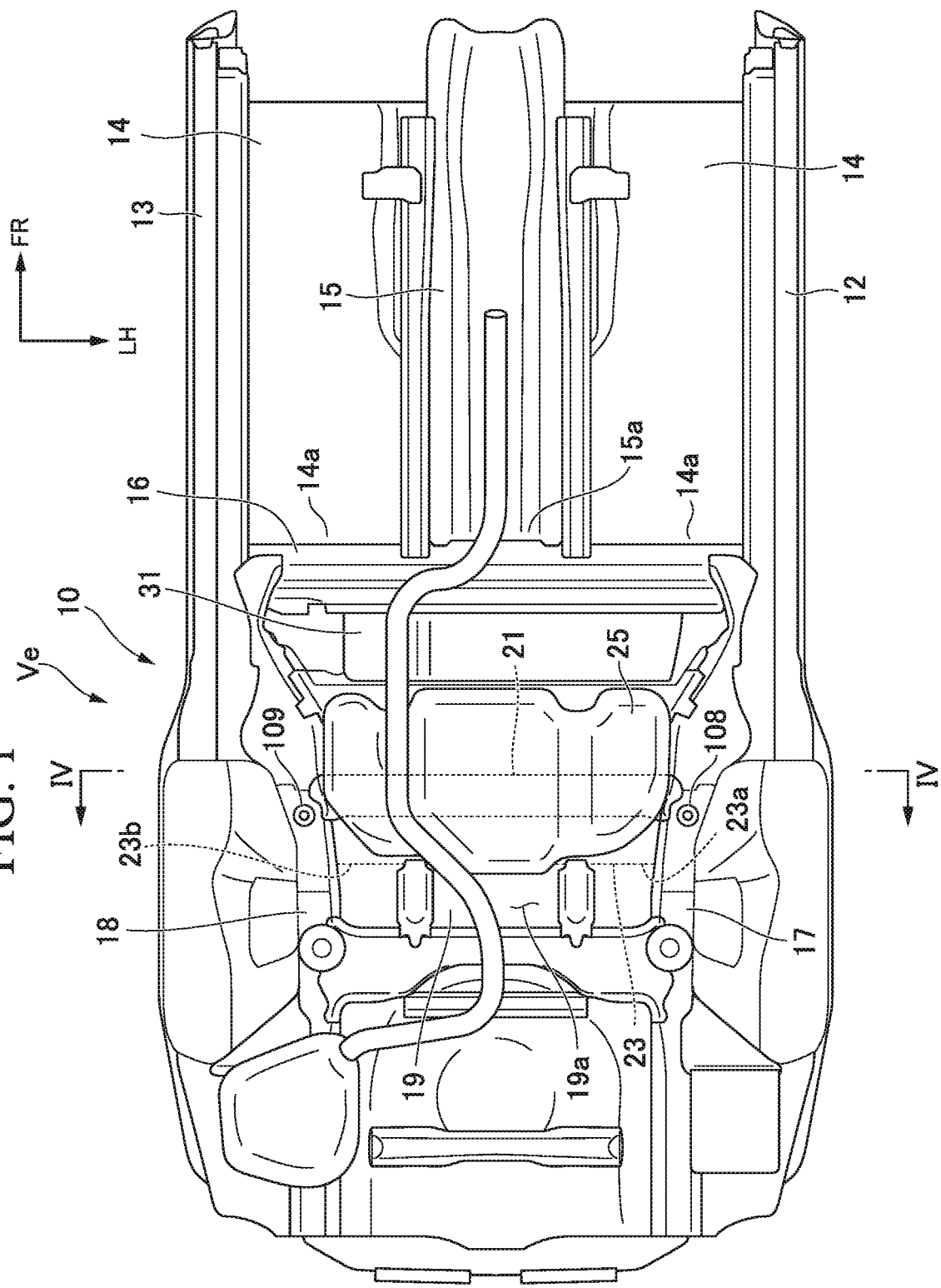
FIG. 1 is a bottom view showing a vehicle body structure according to an embodiment of the present invention.

An embodiment of the present invention will be described with reference to the accompanying drawings. In the drawings, an arrow FR showing a forward direction with respect to a vehicle, an arrow UP showing an upward direction with respect to a vehicle and an arrow LH showing a leftward direction with respect to a vehicle are provided.

Further, a vehicle body structure 10 has a symmetrical configuration in a leftward/rightward direction. Accordingly, the same reference numerals are designated for components on a left side and components on a right side, and components on the left side will be described, and description of components on the right side will be omitted.

As shown in FIG. 1, the vehicle body structure 10 includes left and right side sills 12 and 13, left and right front floor panels 14, a floor tunnel 15, a kick-up unit 16, and left and right rear side frames 17 and 18. In addition, the vehicle body structure 10 includes a rear floor panel (a floor) 19, a first rear cross member (a cross member) 21, a second rear cross member (a second cross member) 23 and a fuel tank 25.

The left side sill 12 and the right side sill 13 are disposed on left and right sides of a central section in a forward/ rearward direction of the vehicle outside in a vehicle width direction and extend in the forward/rearward direction of the vehicle body.

The floor tunnel 15 is installed at a center between the left side sill 12 and the right side sill 13 and extends in the forward/rearward direction of the vehicle body, like the left side sill 12 or the right side sill 13.

The left front floor panel 14 is installed between the floor tunnel 15 and the left side sill 12. The right front floor panel 14 is installed between the floor tunnel 15 and the right side sill 13.

The kick-up unit 16 is installed on rear end portions 14*a* of the left and right front floor panels 14 or a rear end portion 15*a* of the floor tunnel 15. A receiving box 31 (see also FIG. 2) is installed behind the vehicle body of the kick-up unit 16. For example, a PCU, a battery, or the like, may be accommodated in the receiving box 31.

The left rear side frame 17 extends from a rear end portion of the left side sill 12 toward a rear side of the vehicle body. In addition, the right rear side frame 18 extends from a rear end portion of the right side sill 13 toward the rear side of the vehicle body.

The rear floor panel 19 is installed between the left rear side frame 17 and the right rear side frame 18.

The first rear cross member 21 is formed on a back surface 19*a* of the rear floor panel 19. The second rear cross member 23 is installed on a surface 19*b* (see FIG. 2) of the rear floor panel 19 toward the rear of the vehicle body from the first rear cross member 21. The fuel tank 25 is installed below the first rear cross member 21 and the second rear cross member 23.

Figure 2:
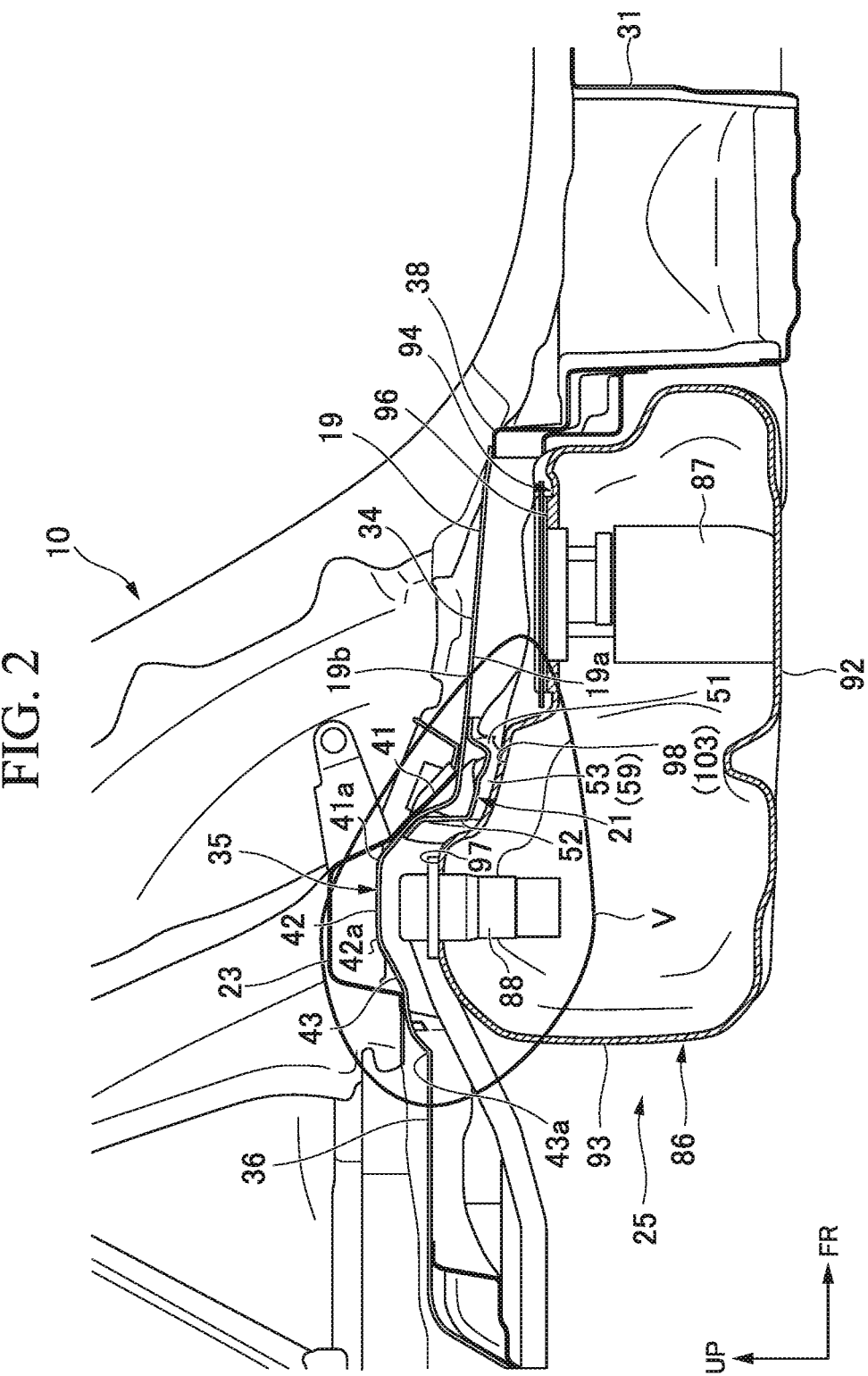
FIG. 2 is a cross-sectional view showing the vehicle body structure according to the embodiment of the present invention taken along line II-II of FIG. 4.
Figure 3:
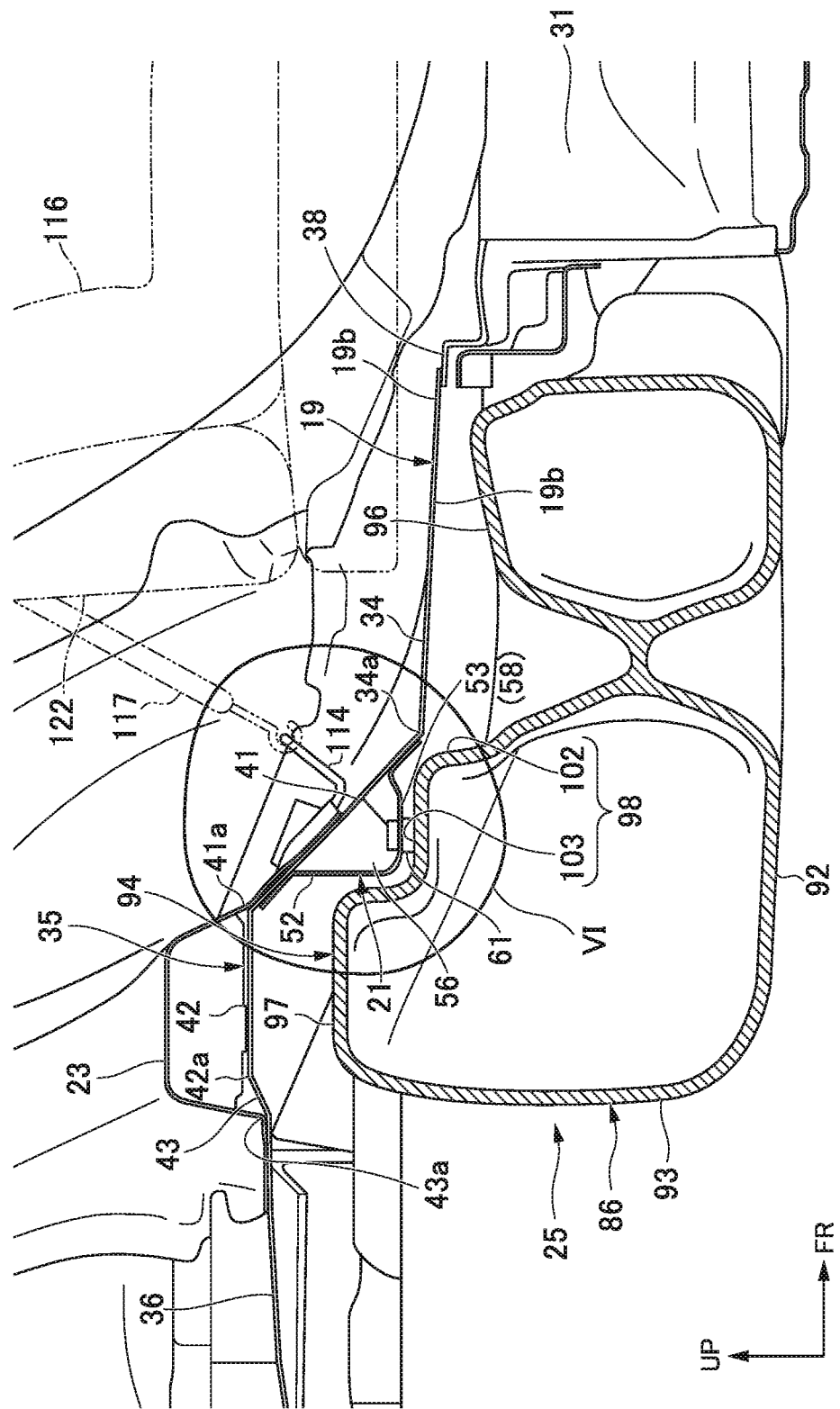
FIG. 3 is a cross-sectional view showing the vehicle body structure according to the embodiment of the present invention taken along line of FIG. 4.

As shown in FIG. 2 and FIG. 3, the rear floor panel 19 includes a first wall 34, a bump 35 and a third wall 36. The first wall 34 extends from a reinforcement member 38 of the receiving box 31 toward the rear side of the vehicle body at a slightly upward gradient. That is, the first wall 34 extends in the forward/rearward direction of the vehicle body. The bump 35 is connected to a rear end portion 34*a* of the first wall 34. The bump 35 has a forward inclined section 41, a second wall 42 and a rearward inclined section 43.

The forward inclined section 41 extends from the rear end portion 34*a* of the first wall 34 toward the rear side of the vehicle body at an upward gradient. The second wall 42 extends from a rear end portion 41*a* of the forward inclined section 41 toward the rear side of the vehicle body in a substantially horizontal direction. That is, the second wall 42 is disposed above the first wall 34 and extends in the forward/rearward direction of the vehicle body.

The rearward inclined section 43 extends from a rear end portion 42*a* of the second wall 42 toward the rear side of the vehicle body at a downward gradient. The bump 35 is constituted by the forward inclined section 41, the second wall 42 and the rearward inclined section 43. The third wall 36 extends from a rear end portion 43*a* of the rearward inclined section 43 toward the rear side of the vehicle body.

The bump 35 is formed while rising upward from the first wall 34 and the third wall 36. A space 45 is formed below the bump 35. The first rear cross member 21 is installed on a back surface of the forward inclined section 41 and a back surface of the first wall 34.

Figure 4:
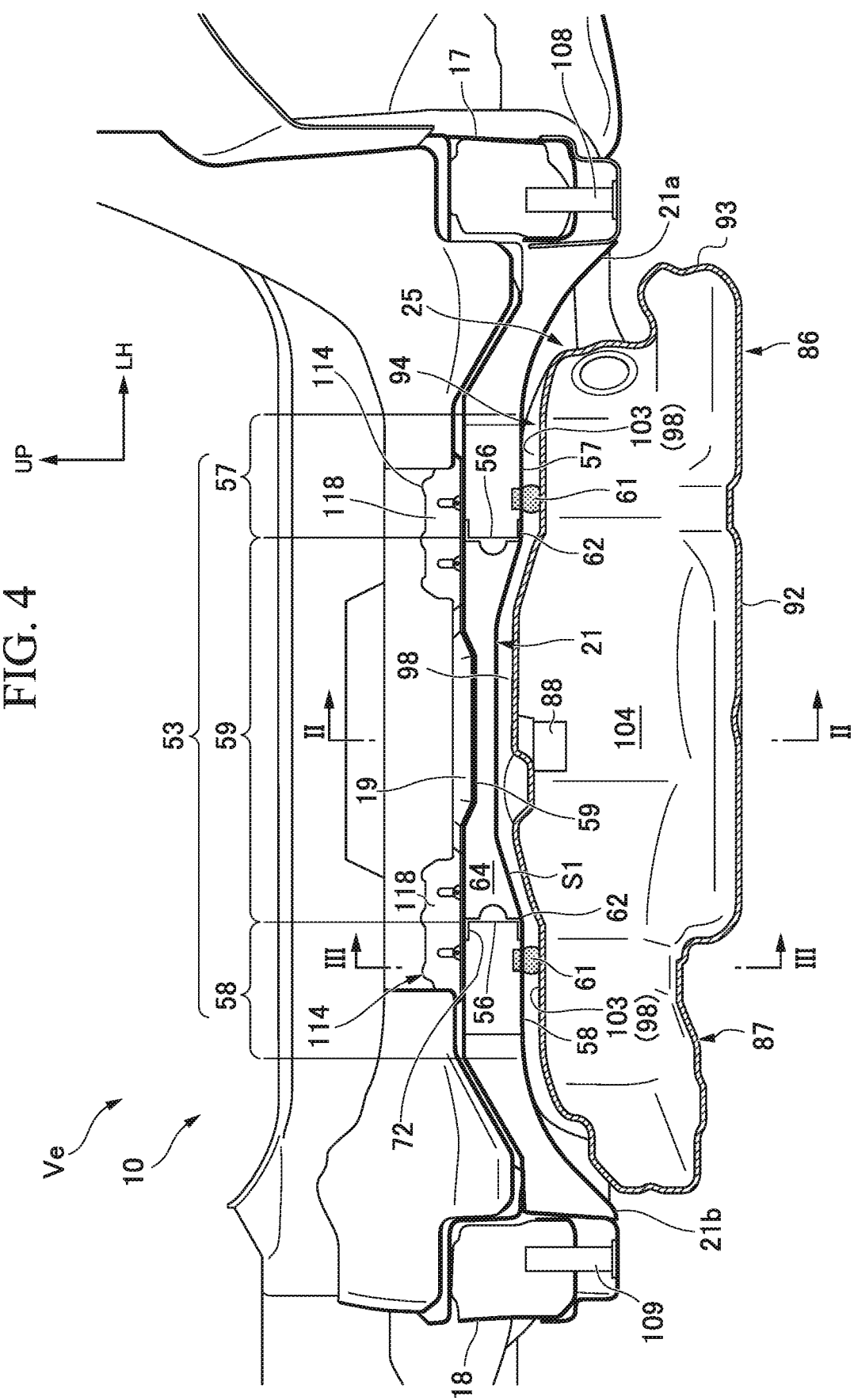
FIG. 4 is a cross-sectional view showing the vehicle body structure according to the embodiment of the present invention taken along line IV-IV of FIG. 1.

As shown in FIG. 4, the first rear cross member 21 bridges between the left rear side frame 17 and the right rear side frame 18. Specifically, a left end portion 21*a* of the first rear cross member 21 is installed on the left rear side frame 17. A right end portion 21*b* of the first rear cross member 21 is installed on the right rear side frame 18.

Figure 5:
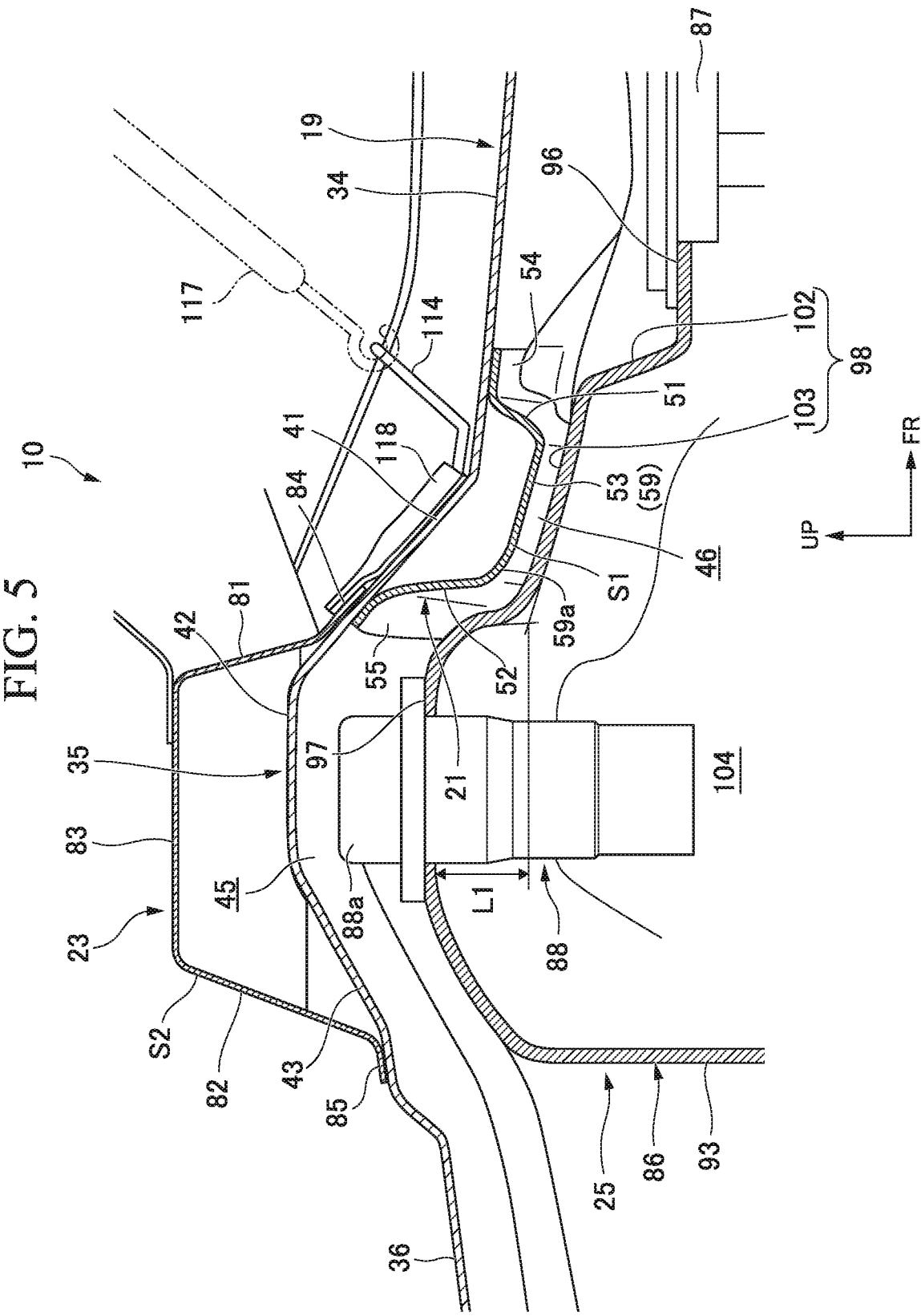
FIG. 5 is a perspective view showing the vehicle body structure according to the embodiment of the present invention, enlarging a portion V of FIG. 2.
Figure 6:
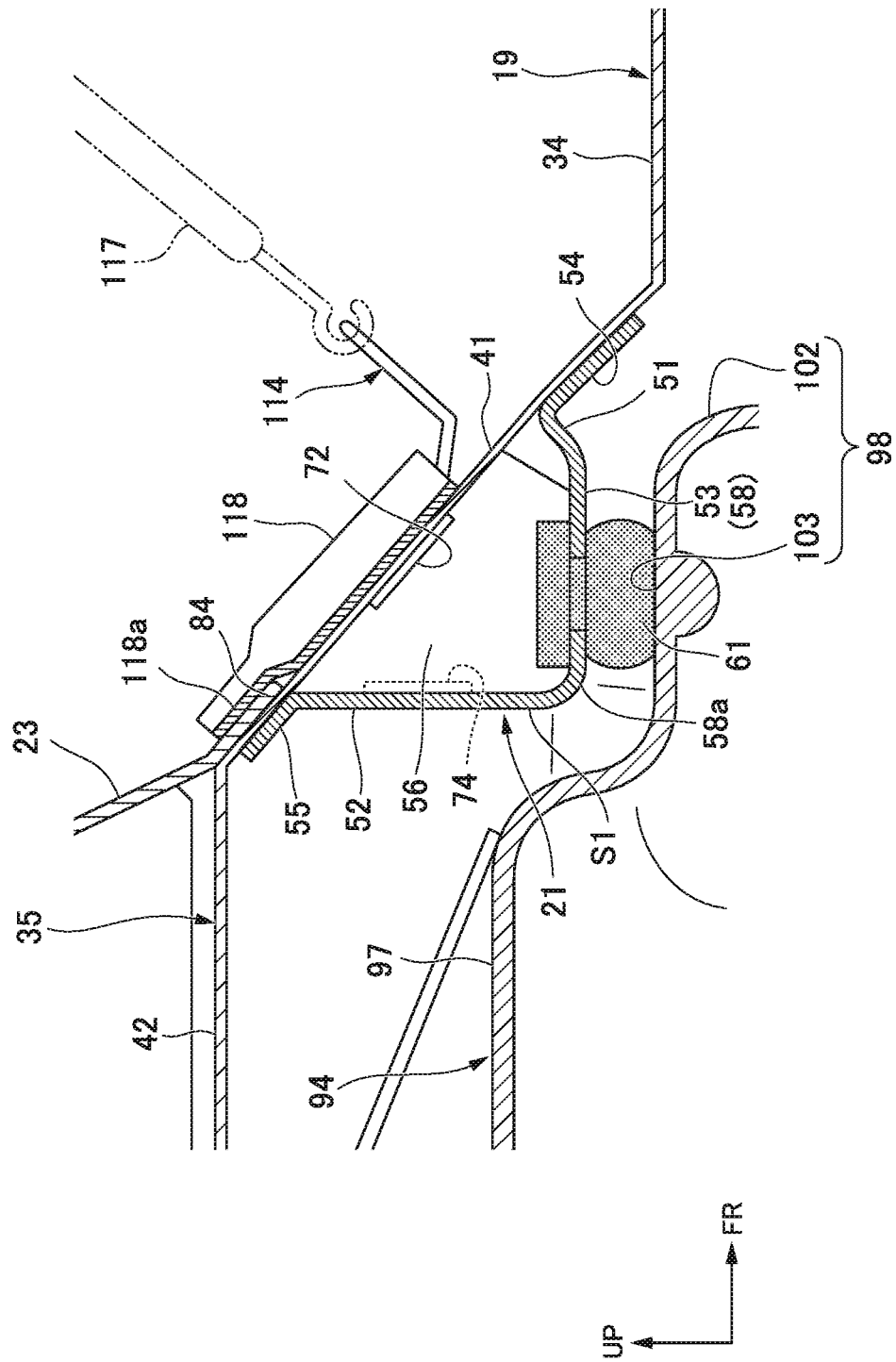
FIG. 6 is a perspective view showing the vehicle body structure according to the embodiment of the present invention, enlarging a portion VI of FIG. 3.

As shown in FIG. 5 and FIG. 6, the first rear cross member 21 is installed below the forward inclined section 41 and the first wall 34 and extends in the vehicle width direction between the first wall 34 and the second wall 42. The first rear cross member 21 includes a pair of first vertical walls 51 and 52, a first horizontal wall 53, a first front flange 54, a first rear flange 55 and a pair of first bulk heads 56.

In the pair of first vertical walls 51 and 52, one first vertical wall 51 is formed at a front side of the vehicle body, and the other first vertical wall 52 is installed at a rear side of the vehicle body. The one first vertical wall 51 projects from the back surface of the rear end portion 34*a* of the first wall 34 and the back surface of the forward inclined section 41 toward the rear side of the vehicle body at a downward gradient. That is, the one first vertical wall 51 extends in the upward/downward direction.

The other first vertical wall 52 is disposed at a distance from the one first vertical wall 51 toward the rear of the vehicle body. The other first vertical wall 52 projects downward from the back surface of the forward inclined section 41. That is, the other first vertical wall 52 extends in the upward/downward direction.

Lower ends of the pair of first vertical walls 51 and 52 are connected to the first horizontal wall 53. The first horizontal wall 53 includes a pair of horizontal sections 57 and 58, and an inclined section 59 in the vehicle width direction (see FIG. 4). The pair of horizontal sections 57 and 58 extend in a substantially horizontal direction. The inclined section 59 extends to be inclined upward from the first wall 34 toward the second wall 42.

The pair of horizontal sections 57 and 58 and the inclined section 59 will be described below in detail.

The first front flange 54 extends from an upper end of the one first vertical wall 51 toward the front side of the vehicle body along the first wall 34 and the forward inclined section 41. The first rear flange 55 extends from an upper end of the other first vertical wall 52 toward the rear side of the vehicle body along the forward inclined section 41. The first front flange 54 is joined to the first wall 34 and the forward inclined section 41, and the first rear flange 55 is joined to the forward inclined section 41.

Accordingly, the first rear cross member 21 is joined to the rear floor panel 19, and a closed cross section S1 is formed between the first rear cross member 21 and the rear floor panel 19.

As shown in FIG. 4, FIG. 5 and FIG. 6, the first horizontal wall 53 includes the pair of horizontal sections 57 and 58 and the inclined section 59. Pressing members 61 are installed on the pair of horizontal sections 57 and 58. The pressing members 61 are members formed of, for example, a resin or a rubber, and come in contact with a connecting surface 98 of a tank apex section 94 (specifically, a second connecting surface 103) from above.

The inclined section 59 is formed at a center in the vehicle width direction. The pair of horizontal sections 57 and 58 are formed at left and right sides (both sides) of the inclined section 59.

The pair of horizontal sections 57 and 58 are formed in a substantially symmetrical shape in a leftward/rightward direction. Hereinafter, the horizontal section 58 on the right side in the pair of horizontal sections 57 and 58 will be described as "the horizontal section 58," and detailed description of the horizontal section 57 on the left side will be omitted.

The horizontal section 58 extends from the lower end of the one first vertical wall 51 to the lower end of the other first vertical wall 52 in a substantially horizontal direction.

Accordingly, a large cross-sectional area is secured for the closed cross section S1 formed by the first rear cross member 21 and the rear floor panel 19. That is, the first rear cross member 21 includes large closed cross sections in a cross-sectional area S1 at left and right sides (both sides).

The inclined section 59 extends obliquely with an upward gradient in an inclined manner from the lower end of the one first vertical wall 51 to the lower end of the other first vertical wall 52. Accordingly, the inclined section 59 is disposed such that a rear end 59a thereof is disposed above a rear end 58a of the horizontal section 58. A space 46 formed below the inclined section 59 is larger than that below the horizontal section 58.

The inclined section 59 is formed from a connecting section 62 between the inclined section 59 and the horizontal section 58 toward the inside in the vehicle width direction at an upward gradient. Accordingly, the closed cross section S1 defined by the first rear cross member 21 and the rear floor panel 19 is formed such that a cross-sectional area from the connecting section 62 between the inclined section 59 and the horizontal section 58 toward the inside in the vehicle width direction gradually decreases. The connecting sections 62 are formed on sides to the left and right of a center of the first rear cross member 21.

Figure 7:
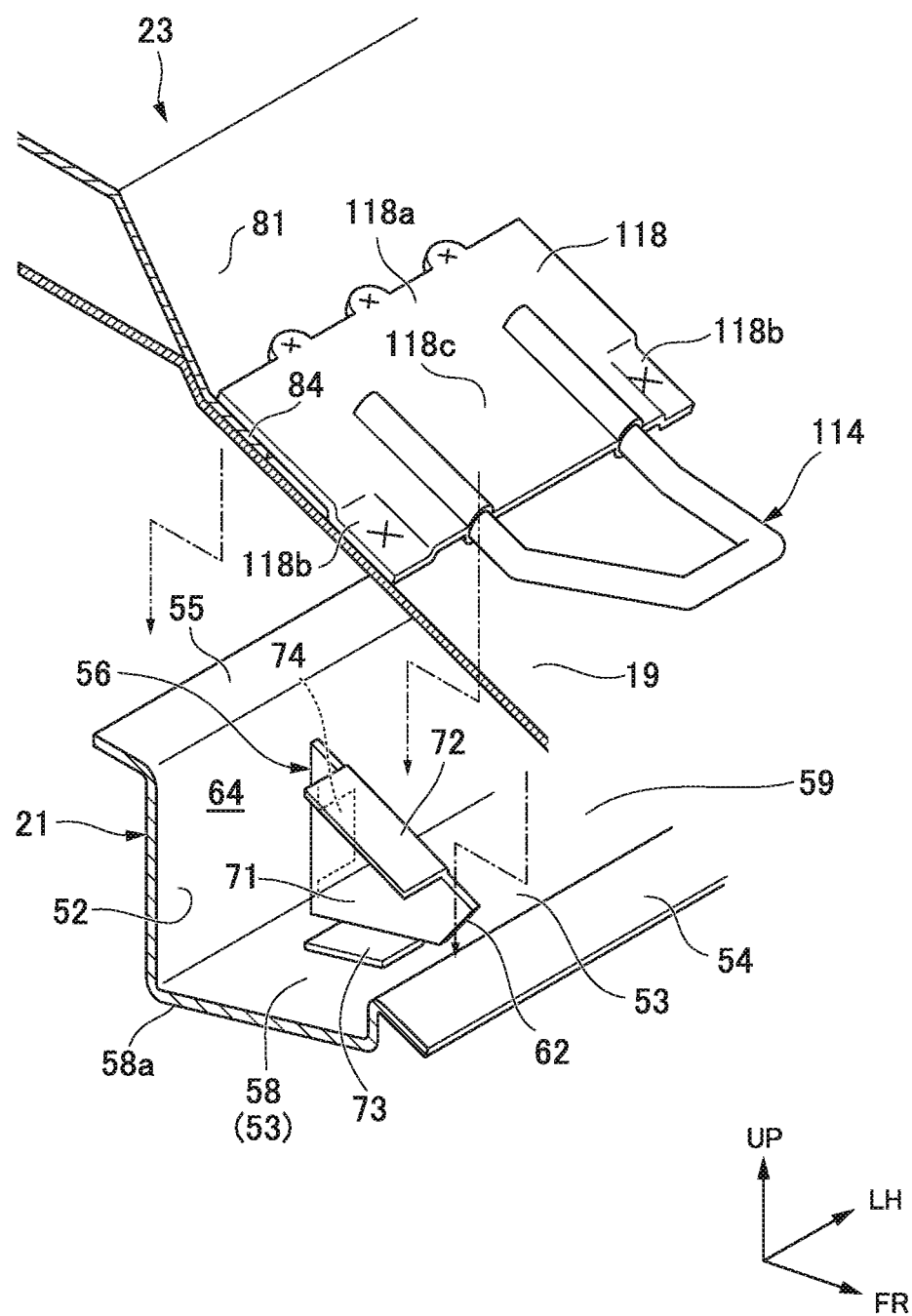
FIG. 7 is an exploded perspective view showing a relation between a first rear cross member and an anchor of the vehicle body structure according to the embodiment of the present invention.

As shown in FIG. 4 and FIG. 7, the first bulk heads 56 are installed on the pair of connecting sections 62, respectively, in an inner section 64 of a closed cross section formed between the first rear cross member 21 and the rear floor panel 19. One of the pair of first bulk heads 56 is installed on the side to the left of the center of the first rear cross member 21. The other of the pair of first bulk heads 56 is installed on the side to the right of the center of the first rear cross member 21.

The pair of first bulk heads 56 are formed substantially symmetrically in a leftward/rightward direction. Accordingly, components of one of the first bulk heads 56 are designated by the same reference numerals as the other first bulk head 56, and detailed description of the other first bulk head 56 will be omitted.

Further, the other first bulk head 56 will be described as "the first bulk head 56" herein below.

The first bulk head 56 has a partition section 71, an upper joining piece 72, a lower joining piece 73 and a rear joining piece 74. The partition section 71 is disposed to extend in a direction crossing a longitudinal direction of the first rear cross member 21 in the inner section 64 of the closed cross section S1 formed by the first rear cross member 21 and the rear floor panel 19.

The upper joining piece 72 is bent from an upper side of the partition section 71 toward the outside in the vehicle width direction. The lower joining piece 73 is bent from a lower side of the partition section 71 toward the outside in the vehicle width direction. The rear joining piece 74 is bent from a rear side of the partition section 71 toward the inside in the vehicle width direction.

The upper joining piece 72 is joined to the rear floor panel 19, and the lower joining piece 73 is joined to the first horizontal wall 53. The rear joining piece 74 is joined to the other first vertical wall 52.

Accordingly, the first bulk heads 56 are installed on the connecting sections 62 in the inner section 64 of the closed cross section S1 formed by the first rear cross member 21 and the rear floor panel 19. Specifically, the first bulk heads 56 are formed to extend in a direction in which the partition section 71 crosses a longitudinal direction of the first rear cross member 21.

Here, the first rear cross member 21 has a cross-sectional area of the closed cross section S1 that decreases from the connecting section 62 toward the inclined section 59. That is, a cross-sectional area of the closed cross section S1 in the connecting section 62 between the horizontal section 58 and the inclined section 59 varies. For this reason, it is thought that stress is concentrated on the connecting section 62 between the horizontal section 58 and the inclined section 59, and the connecting section 62 become an origin for fracturing of the first rear cross member 21.

Here, the first bulk heads 56 are installed on the connecting sections 62 between the horizontal section 58 and the inclined section 59. Accordingly, the connecting sections 62 can be reinforced by the first bulk heads 56. Accordingly, the connecting sections 62 can be prevented from becoming origins for fracturing of the first rear cross member 21.

As shown in FIG. 1 and FIG. 5, the second rear cross member 23 is installed above the second wall 42. The second rear cross member 23 bridges between the left rear side frame 17 and the right rear side frame 18, like the first rear cross member 21. Specifically, a left end portion 23a of the second rear cross member 23 is installed on the left rear side frame 17. A right end portion 23b of the second rear cross member 23 is installed on the right rear side frame 18.

The second rear cross member 23 includes a pair of second vertical walls 81 and 82, a second horizontal wall 83, a second front flange 84 and a second rear flange 85.

In the pair of second vertical walls 81 and 82, one second vertical wall 81 is installed on the front side of the vehicle body, and the other second vertical wall 82 is installed on the rear side of the vehicle body. The one second vertical wall 81 project from the surface of the forward inclined section 41 toward the rear side of the vehicle body at an upward gradient. That is, the one second vertical wall 81 extends in the upward/downward direction.

The other second vertical wall 82 is disposed at a distance from the one second vertical wall 81 toward the rear of the vehicle body. The other second vertical wall 82 projects from the surface of the rearward inclined section 43 toward the front side of the vehicle body at an upward gradient. That is, the other second vertical wall 82 extends in the upward/downward direction.

Upper ends of the pair of second vertical walls 81 and 82 are connected by the second horizontal wall 83. The second horizontal wall 83 extends in a substantially horizontal direction.

The second front flange 84 extends from the lower end of the one second vertical wall 81 toward the front side of the vehicle body along the forward inclined section 41. The second rear flange 85 extends from the lower end of the other second vertical wall 82 toward the rear side of the vehicle body along the rearward inclined section 43. The second front flange 84 is joined to the forward inclined section 41, and the second rear flange 85 is joined to the rearward inclined section 43.

Accordingly, the second rear cross member 23 is joined to the rear floor panel 19, and a closed cross section S2 is formed by the second rear cross member 23 and the rear floor panel 19.

That is, the second rear cross member 23 is installed on the bump 35.

Incidentally, the second wall 42 is disposed above the first wall 34. For this reason, devices to secure the strength (rigidity) for the second wall 42 are required. Here, the second rear cross member 23 is installed above the second wall 42. Accordingly, the strength of the second wall 42 can be reinforced by the second rear cross member 23.

In addition, the bump 35 of the rear floor panel 19 rises upward from the first wall 34 and the third wall 36. The space 45 is formed below the bump 35. That is, the space 45 is formed below the second rear cross member 23.

An opening/closing valve 88 of the fuel tank 25 is disposed using the space 45. Hereinafter, the opening/closing valve 88 will be described as "a vent shaft float valve (a VSF valve) 88."

The VSF valve 88 is disposed above and corresponding to the second wall 42 and is included in the fuel tank 25. The VSF valve 88 is opened when evaporated fuel is generated in an inner section 104 of the fuel tank 25 and an internal pressure of the fuel tank 25 has increased. When the VSF valve 88 is open, the evaporated fuel is guided into a canister. That is, the VSF valve 88 is disposed above a liquid surface of the fuel such that the evaporated fuel can be extracted from the opening.

Further, in the embodiment, while the VSF valve 88 is exemplified as the opening/closing valve, there is no limitation thereto. Another opening/closing valve may be used.

As shown in FIG. 2 and FIG. 3, the fuel tank 25 is disposed below the rear floor panel 19. The fuel tank 25 includes a tank main body 86, a fuel pump 87 and the VSF valve 88. The fuel pump 87 supplies the fuel to, for example, a throttle body in a state in which the fuel is suctioned up from the inside of the tank main body 86 and a pressure is applied.

The tank main body 86 is formed of, for example, a resin material. The tank main body 86 includes a tank bottom section 92, a tank circumferential wall section 93 and the tank apex section 94. The tank apex section 94 includes a first surface 96, a second surface 97 and the connecting surface 98.

The first surface 96 is a surface that forms a front side of the vehicle body. The first surface 96 is disposed below the first wall 34 and extends substantially horizontally along the first wall 34. The second surface 97 is a surface that forms a rear side of the vehicle body. The second surface 97 is disposed below the second wall 42 and extends along the second wall 42.

As shown in FIG. 3 and FIG. 5, the first surface 96 and the second surface 97 are connected by the connecting surface 98.

The connecting surface 98 has a first connecting surface 102 and the second connecting surface 103. The first connecting surface 102 stands upward from a rear end of the first surface 96. The second connecting surface 103 is disposed below the first horizontal wall (the horizontal wall) 53. The second connecting surface 103 extends from an upper end of the first connecting surface 102 to a front end of the second surface 97 along the first horizontal wall 53 and the first vertical wall 52.

As shown in FIG. 4 and FIG. 5, the VSF valve 88 is installed on the upper section (i.e., the second surface 97) of the fuel tank 25. Specifically, the VSF valve 88 is installed on the second surface 97 at a position overlapping the inclined section 59 of the first rear cross member 21 in the forward/rearward direction of the vehicle body.

In this way, the first surface 96 and the second surface 97 of the fuel tank 25 are connected by the connecting surface 98, and the connecting surface 98 extends along the first horizontal wall 53 and the first vertical wall 52 of the first rear cross member 21. The first horizontal wall 53 includes the horizontal section 58 and the inclined section 59. The VSF valve 88 is installed at a position overlapping the inclined section 59 in the forward/rearward direction of the vehicle body.

Accordingly, an area (i.e., the second connecting surface 103) of the connecting surface 98 overlapping the VSF valve 88 in the forward/rearward direction of the vehicle body can be formed along the inclined section 59. That is, the connecting surface 98 is formed so as to be inclined, and a protrusion amount L1 of the connecting surface 98 to the inner section 104 of the fuel tank 25 is restricted to a small degree.

Accordingly, for example, when a vehicle Ve is stopped while being inclined, if the VSF valve 88 is disposed below the inclined fuel tank 25, it is possible to prevent fuel 105 from coming in contact with the connecting surface 98.

In addition, the first horizontal wall 53 of the first rear cross member 21 includes the pair of horizontal sections 57 and 58 and the inclined section 59. Areas of both sides of the first horizontal wall 53 in the vehicle width direction of the inclined section 59 can become the pair of horizontal sections 57 and 58. Accordingly, reduction in cross-sectional area of the closed cross section S1 of the first rear cross member 21 can be inhibited to, for example, a minimum level, and rigidity for the first rear cross member 21 can be secured.

Here, rear suspension attachment sections 108 and 109 are formed in portions of the left rear side frame 17 and the right rear side frame 18 close to both of side portions (left and right end portions) 21a and 21b of the first rear cross member 21. Accordingly, it is thought that a load from, for example, a rear suspension (not shown) is input to both of the side portions 21a and 21b of the first rear cross member 21. For this reason, it is preferable to secure rigidity for both of the side portion 21a and 21b sides of the first rear cross member 21.

Here, the inclined section 59 of the first rear cross member 21 is formed at a center in the vehicle width direction, and the pair of horizontal sections 57 and 58 are formed at both of the side portion 21a and 21b sides of the inclined section 59. The pair of horizontal sections 57 and 58 are formed to have a larger cross-sectional area of the closed cross section S1 than the inclined section 59.

Accordingly, the rigidity of both of the side portion 21a and 21b sides of the first rear cross member 21 is increased. Accordingly, for example, rigidity for both of the side portion 21a and 21b sides of the first rear cross member 21 with respect to a load input from the rear suspension can be secured. That is, rigidity for the first rear cross member 21 is secured.

In addition, the bump 35 of the rear floor panel 19 rises upward from the first wall 34 and the third wall 36, and the space 45 is formed below the bump 35. The second rear cross member 23 is installed above the second wall 42 of the bump 35. The space 45 is formed below the second rear cross member 23.

The VSF valve 88 has at least a portion (an upper section) 88a disposed below the second rear cross member 23. That is, the VSF valve 88 of the fuel tank 25 is disposed using the space 45 below the second rear cross member 23. Accordingly, the VSF valve 88 is disposed above and corresponding to the second wall 42. Accordingly, the second surface 97 of the fuel tank 25 is disposed above the vicinity of the second wall 42 to be aligned with the VSF valve 88. Accordingly, a large tank capacity for the fuel tank 25 can be secured.

As shown in FIG. 3, a rear seat 112 is disposed above the first wall 34. The first rear cross member 21 (including the first bulk heads 56) and the second rear cross member 23 are installed toward the rear of the vehicle body from the rear seat 112. An anchor 114 for a child seat is connected to the first rear cross member 21 (including the first bulk heads 56) and the second rear cross member 23.

The anchor 114 is an anchor configured to connect a connector 117 of a child seat 116. In a state in which the child seat 116 is attached to the rear seat 112, the connector 117 of the child seat 116 is connected to the anchor 114.

As shown in FIG. 6 and FIG. 7, the anchor 114 includes an attachment bracket 118. A rear end portion 118a of the attachment bracket 118 is joined to the second front flange 84 of the second rear cross member 23, the forward inclined section 41 of the rear floor panel 19 and the first rear flange 55 of the first rear cross member 21 in a state in which they overlap each other from above.

In addition, a front end portion 118b of the attachment bracket 118 is joined to the forward inclined section 41 of the rear floor panel 19 from above. Further, a central section 118c of the attachment bracket 118 is joined to the forward inclined section 41 of the rear floor panel 19 and the upper joining pieces 72 of the first bulk heads 56 from above.

As the central section 118c of the attachment bracket 118 is joined to the upper joining pieces 72 of the first bulk heads 56, the anchor 114 is strongly attached using the first bulk heads 56. In this way, the anchor 114 is strongly attached using the first bulk heads 56. Accordingly, a reinforcement member configured to strongly attach the anchor 114 can be removed, and the number of parts can be reduced.

Figure 8A:
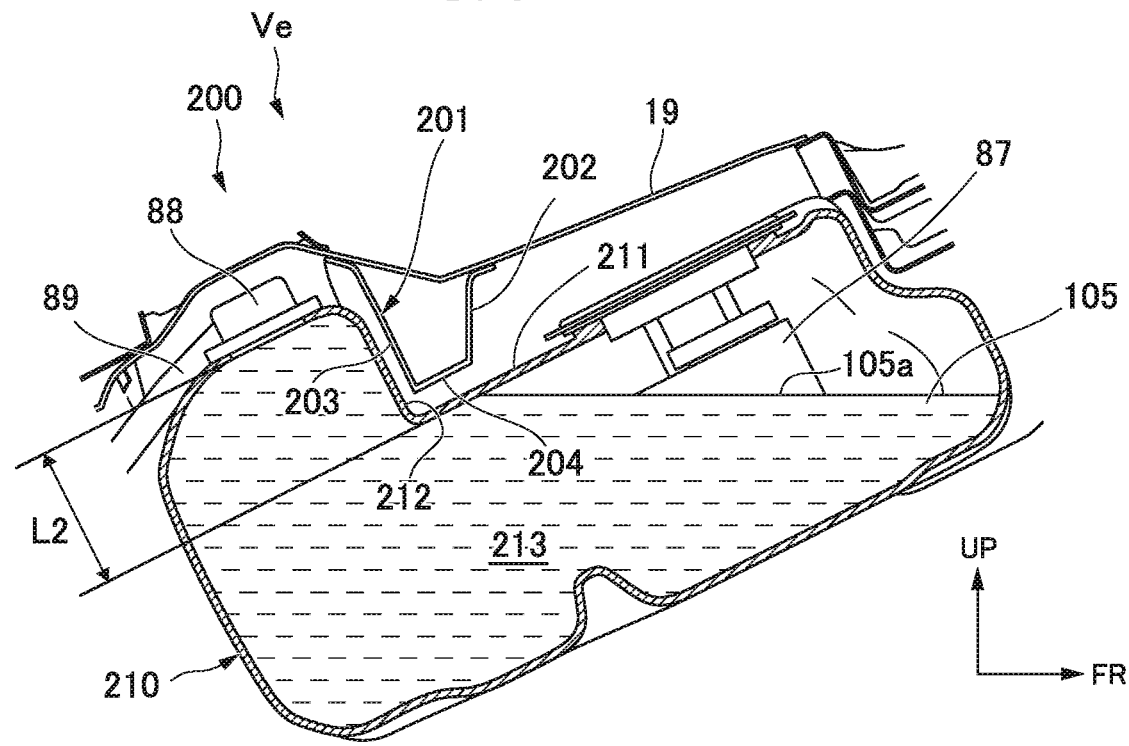
FIG. 8A is a cross-sectional view illustrating a relation between a VSF valve and fuel in a comparative example.
Figure 8B:
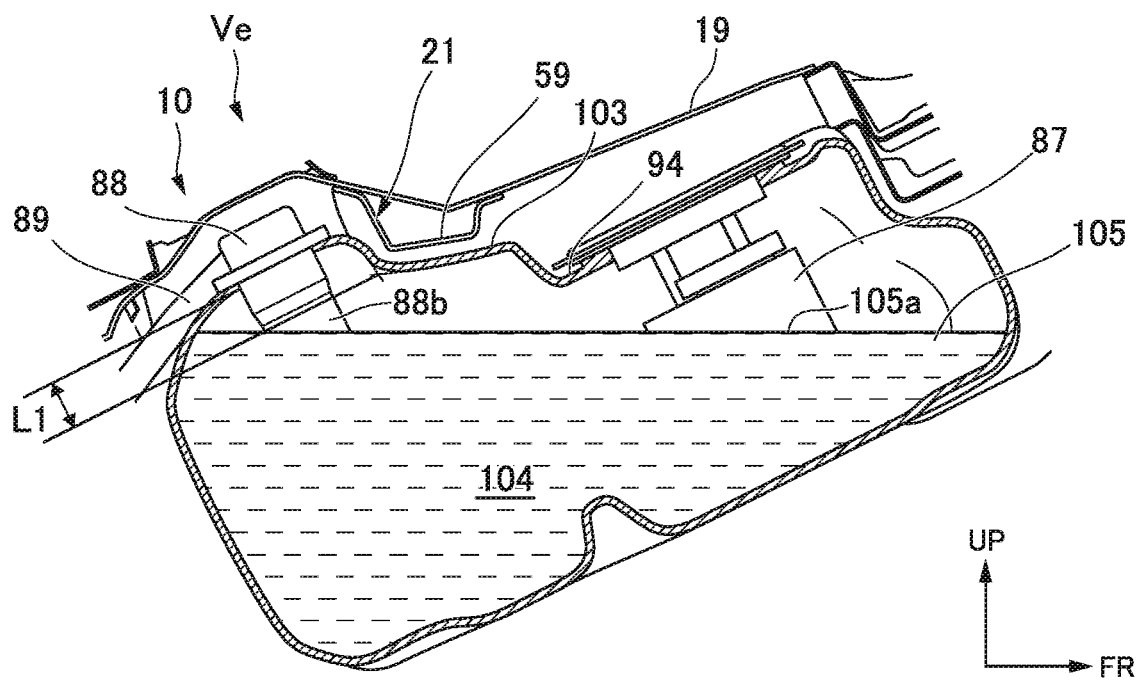
FIG. 8B is a cross-sectional view for explaining a relation between a VSF valve and fuel in the embodiment.

Next, in a state in which the vehicle Ve is stopped while being inclined, a relation between the VSF valve 88 and the fuel 105 will be described with reference to FIGS. 8A and 8B. FIG. 8A shows a vehicle body structure 200 of a comparative example, and FIG. 8B shows the vehicle body structure 10 of the embodiment.

As shown in FIG. 8A, the vehicle body structure 200 of the comparative example includes a first rear cross member 201. The first rear cross member 201 has a first horizontal wall 204 connected to lower ends of a pair of first vertical walls 202 and 203. The first horizontal wall 204 is formed horizontally in the entire region in the vehicle width direction.

Accordingly, the first horizontal wall 204 of the first rear cross member 201 protrudes relatively downward to a large extent in the entire region in the vehicle width direction. A tank apex section 211 of a fuel tank 210 has a large concave section 212 formed therein to avoid the first horizontal wall 204 of the first rear cross member 201. For this reason, a protrusion amount L2 of the concave section 212 to an inner section 213 of the fuel tank 210 is increased.

Here, when the vehicle Ve is stopped while being inclined, the VSF valve 88 may be disposed below the inclined fuel tank 210. In this case, it is assumed that a liquid surface 105a of the fuel 105 comes in contact with the concave section 212 protruding from the inner section 213 of the fuel tank 210, and air is not guided to the lower side of the fuel tank 210 (i.e., the VSF valve 88 side).

The fuel 105 may remain in the fuel tank 210 on the side of the VSF valve 88, the VSF valve 88 may be immersed in the remaining fuel 105, and a gas introduction port 88b (see FIG. 8B) of the VSF valve 88 may be closed by the fuel 105. For this reason, it is difficult for the evaporated fuel in the fuel tank 210 to be guided from the gas introduction port 88b of the VSF valve 88 to the canister (not shown) via a flow path 89.

As shown in FIG. 8B, the vehicle body structure 10 of the embodiment has the VSF valve 88 installed at a position overlapping the inclined section 59 of the first rear cross member 21 in the forward/rearward direction of the vehicle body. The second connecting surface 103 overlapping the VSF valve 88 in the forward/rearward direction of the vehicle body can be formed in the tank apex section 94 of the fuel tank 25 so as to be inclined along the inclined section 59. Accordingly, the protrusion amount L1 of the second connecting surface 103 to the inner section 104 of the fuel tank 25 is restricted to a small degree.

Accordingly, for example, when the vehicle Ve is stopped while being inclined, if the VSF valve 88 is disposed below the inclined fuel tank 25, it is possible to prevent the liquid surface 105a of the fuel 105 from coming in contact with the second connecting surface 103. As the contact of the fuel 105 with the second connecting surface 103 is prevented, air can be guided to the lower side of the fuel tank 25 (i.e., the VSF valve 88 side). As the air is guided to the VSF valve 88 side of the fuel tank 25, the fuel 105 in the fuel tank 25 on the side of the VSF valve 88 can be moved upward.

Accordingly, it is possible to prevent the VSF valve 88 from being immersed in the fuel 105 and the gas introduction port 88b of the VSF valve 88 from being closed by the fuel. Accordingly, the evaporated fuel in the fuel tank 25 can be guided from the gas introduction port 88b of the VSF valve 88 to the canister (not shown) via the flow path 89.

Further, the technical spirit of the present invention is not limited to the above-mentioned embodiment and various modifications may be made without departing from the spirit of the present invention.

For example, while the rear floor panel 19 has been exemplified as a floor in the embodiment, there is no limitation thereto. As another example, for example, a front floor panel or the like may be also be applied for the floor.

In addition, while the first rear cross member 21 has been exemplified as the cross member in the embodiment, there is no limitation thereto. As another example, for example, the cross member may also be applied to the front cross member, the middle cross member, or the like.

What is claimed is:

1. A vehicle body structure comprising:
    a floor including a first wall extending in a forward/rearward direction of a vehicle body and a second wall disposed above the first wall and extending in the forward/rearward direction of the vehicle body;
    a cross member installed below the floor and extending in a vehicle width direction between the first wall and the second wall;
    a fuel tank disposed below the floor; and
    an opening/closing valve installed on an upper section of the fuel tank,
    wherein the cross member comprises:
    a pair of vertical walls extending in an upward/downward direction; and
    a horizontal wall configured to connect lower ends of the pair of vertical walls, the fuel tank comprises:
    a first surface extending along the first wall;
    a second surface extending along the second wall; and
    a connecting surface configured to connect the first surface and the second surface and extending along the horizontal wall, the horizontal wall comprises:
    horizontal sections extending in a substantially horizontal direction; and
    an inclined section inclined upward from the first wall toward the second wall, and
    the opening/closing valve is installed at a position overlapping the inclined section in the forward/rearward direction of the vehicle body.

2. The vehicle body structure according to claim 1, wherein the inclined section is formed at a center in the vehicle width direction, and the horizontal sections are formed at both sides of the inclined section.

3. The vehicle body structure according to claim 1, wherein a bulk head extending in a direction crossing a longitudinal direction of the cross member is installed on a connecting section between the horizontal section and the inclined section.

4. The vehicle body structure according to claim 3, wherein a seat is disposed above the first wall, and
an anchor for a child seat attached to the seat is connected to the bulk head.

5. The vehicle body structure according to claim 1, wherein a second cross member is installed above the second wall, and
the opening/closing valve has at least a portion disposed below the second cross member.

* * * * *